Sept. 12, 1967  R. E. YOUNG  3,340,748

MULTI-ENGINE DRIVE MECHANISM

Filed Jan. 28, 1965  4 Sheets-Sheet 1

INVENTOR
RICHARD E. YOUNG
BY Albert M. Parker
ATTORNEY

Sept. 12, 1967 R. E. YOUNG 3,340,748
MULTI-ENGINE DRIVE MECHANISM
Filed Jan. 28, 1965 4 Sheets-Sheet 2

INVENTOR
RICHARD E. YOUNG
BY Albert M. Parker
ATTORNEY

Sept. 12, 1967  R. E. YOUNG  3,340,748
MULTI-ENGINE DRIVE MECHANISM
Filed Jan. 28, 1965  4 Sheets-Sheet 3

INVENTOR
RICHARD E. YOUNG
BY Albert M. Parker
ATTORNEY

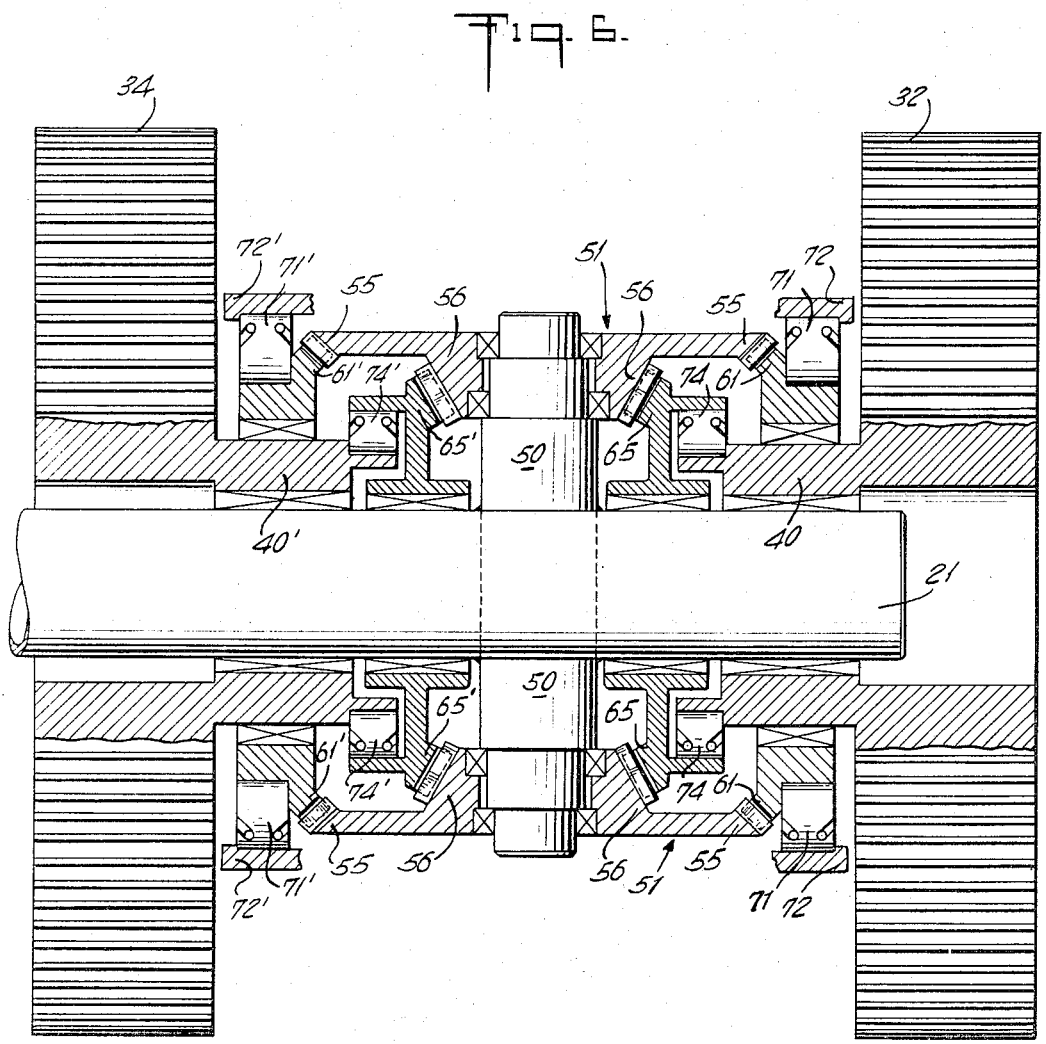

United States Patent Office 3,340,748
Patented Sept. 12, 1967

3,340,748
MULTI-ENGINE DRIVE MECHANISM
Richard E. Young, Rocky Hill, N.J., assignor to Unitwin Corporation, Rocky Hill, N.J., a corporation of New Jersey
Filed Jan. 28, 1965, Ser. No. 428,778
25 Claims. (Cl. 74—661)

This invention relates to a multi-engine drive mechanism, such mechanism being useful in the coupling of a plurality of prime movers to a driven shaft or the like which may be selectively driven by one or a plurality of the prime movers.

The drive mechanism of the invention is illustrated and described herein as employed to drive the propeller of an airplane. Although in such application the drive mechanism displays some of its greatest advantages, it is to be understood that the drive mechanism of the invention is not limited to use in the airplane field but that it may be employed to advantage in the driving of other vehicles or apparatus generally, wherein a driven member such as a shaft is advantageously selectively driven by one or a plurality of prime movers.

As above indicated, the multi-engine drive mechanism of the invention is shown herein in a preferred embodiment wherein it is employed in an airplane to couple two engines to a single propeller shaft. The mechanism thus permits the propeller shaft to be driven selectively by one or both of the airplane engines. Assuming that either engiven is powerful enough to sustain the airplane in flight, the mechanism thus provides the airplane with a substantial safety factor.

It is customary in two-engine airplanes to mount the engines on opposite sides of the fuselage of the airplane. Even though sustained flight may be maintained with either engine, if one engine fails the center of thrust of the airplane is very substantially altered. Although such alteration is ordinarily not serious when the airplane is at a substantial height, it does become serious during take-off and landing operations. With the mechanism of the present invention, on the other hand, even though one engine should fail the line of thrust of the propeller remains the same; as a result the control of the aircraft is not seriously altered.

Further, in accordance with the invention the drive mechanism automatically establishes a predetermined desired speed ratio between the prime movers and the driven shaft or member when both prime movers are operating at the same speed. Upon the stopping of one of the prime movers, however, the drive mechanism automatically changes the speed ratio between the still operative prim mover and the driven shaft or element whereby to maintain the operative unit at its highest efficiency and to apply the power output to driving the vehicle in an optimum manner. With the airplane shown, the drive mechanism is to constructed and arranged that upon the failure of one engine the speed at which the propeller shaft is driven is automatically decreased to a second predetermined speed ratio which is the optimum ratio for single engine operation.

The invention has among its objects the provision of a novel drive mechanism for selectively coupling a single prime mover or a plurality of prime movers to a single driven element such as a shaft.

A further object of the invention lies in the provision of a drive mechanism of the type indicated wherein the driving speed ratio between the one or more prime movers and the driven element is changed upon a change in the number of the prime movers which are drivingly connected to the driven element.

Another object of the invention is the provision of a drive mechanism of the type indicated immediately above wherein the change in the driving speed ratio is effected automatically and without the necessity of using sliding gears or the like.

Yet another object of the invention is the provision of a novel multi-engine drive for a vehicle which may be driven by one or more prime movers, the vehicle including the novel driving mechanism of the invention.

A still further object of the invention is the provision of a multi-engine aircraft which is capable of sustained flight on less than all of its engines, such engines being coupled to a propeller shaft by driving mechanism in accordance with the invention.

The above and further objects and novel features of the invention will more fully appear from the following description when the same is read in connection with the acompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary view in side elevation of a two-engine airplane incorporating a preferred embodiment of the drive mechanism of the invention, certain of the parts of the engine cowling being broken away for clarity of illustration;

FIG. 3 is a fragmentary view in plan of the forward, engine compartment section of the airplane, portions of the cowling being removed;

FIG. 6 is a schematic simplified view partially in elevation and partially in section through the drive mechanism of FIG. 5.

Figure 1:
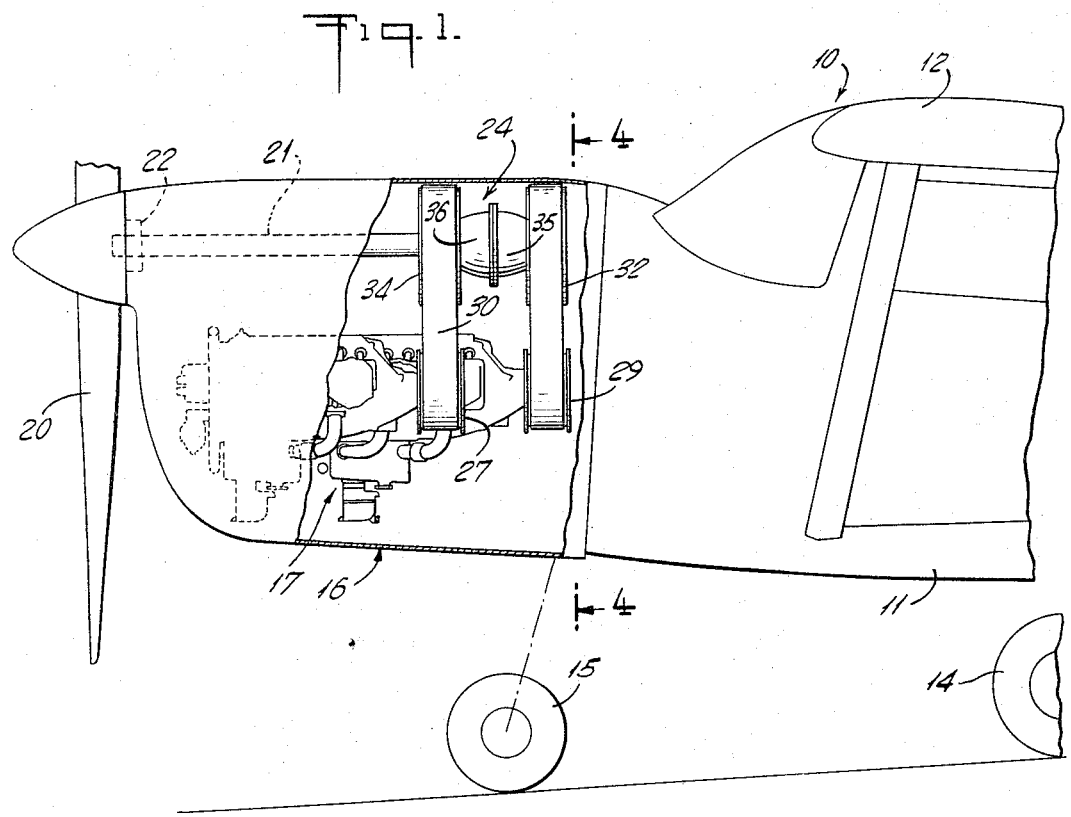
Figure 2:
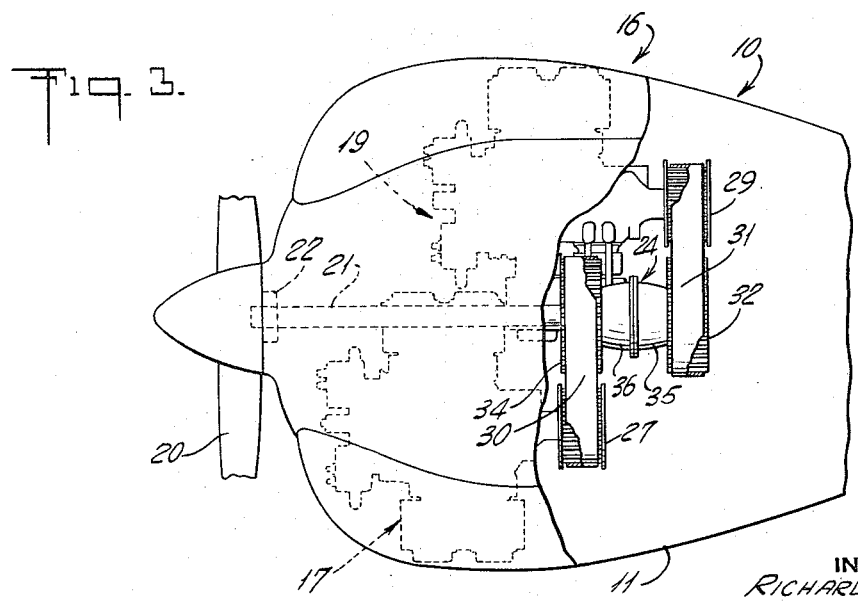
FIG. 2 is a fragmentary view in front elevation of the airplane of FIG. 1, portions of the cowling of the airplane being broken away and the propeller of the airplane being omitted.
Figure 2:
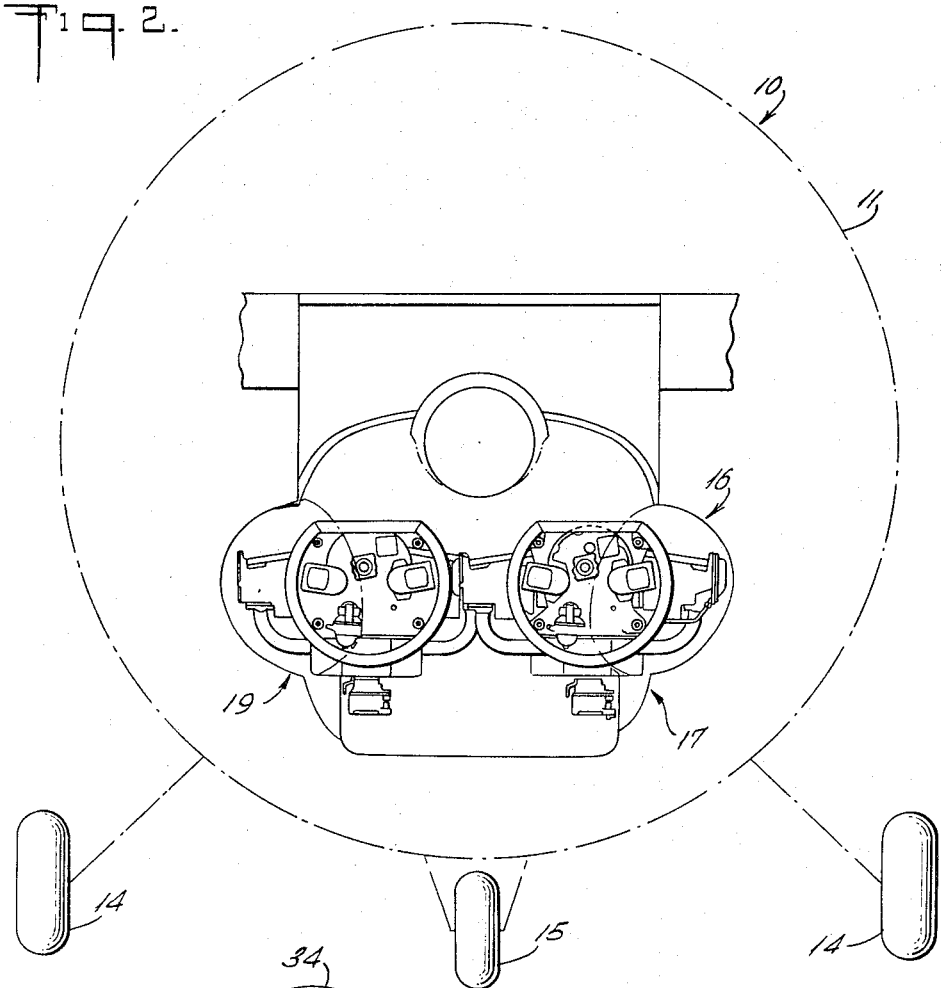
Figure 4:
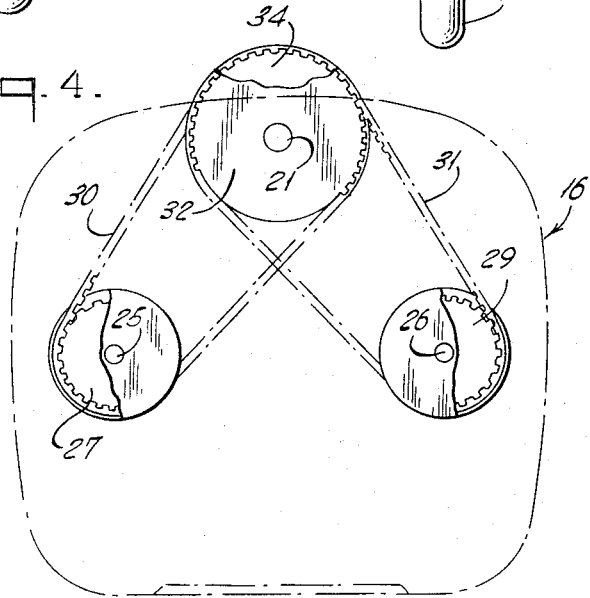
FIG. 4 is a somewhat simplified schematic view in rear elevation of the mechanism for driving the propeller shaft of the airplane, the view being taken from the line 4—4 of FIG. 1 and looking in a forward direction.

The illustrative embodiment of drive mechanism in accordance with the invention is shown incorporated in an airplane fragmentarily shown in FIGS. 1–4, inclusive, and generally designated by the reference character 10. Such airplane, which is conventional except for the drive mechanism and the novel manner of mounting two engines to drive a single propeller shaft, has a fuselage 11, a wing 12, main landing wheels 14, and a nose wheel 15. The forward end of the fuselage is formed as a compartment 16 housing similar first and second engines 17 and 19, respectively. Engines 17 and 19 are located in the same general horizontal plane, engine 17 being disposed somewhat forwardly of engine 19 to provide for the convenient connecting of the output shafts of the engines to the coupling and gearing mechanism 24 to be described. The airplane is provided with a single propeller 20 which is mounted upon a propeller shaft 21 located somewhat above the plane of the engines and centrally therebetween. Shaft 21 is journalled in suitable radial and thrust bearings, of which one is generally indicated at 22 adjacent the forward end of the shaft, other bearings being located within the driving mechanism 24, to be described.

As above indicated, the mechanism 24 couples the engines 17 and 19 to the propeller shafts 21 so that when both engines are operating at the same speed the propeller shaft is driven in a first, higher speed ratio with respect to the speeds of the engine output shafts. Upon the stopping of one of the engines and with the other engine remaining operative, the propeller shaft 21 continues to rotate, but is now driven at a second, lower speed ratio with respect to the output shaft of the operative engine. Engine 17 has an output shaft 25, engine 19 having a similar output shaft 26. In the illustrative embodiment, shafts 25 and 26 are drivingly connected to the gearing mechanism 24 by "Timing Belt" drives, the first such drive consisting of a pulley 27 on motor shaft 25, a pulley 34 mounted at the forward end of the mechanism 24 and a belt 30 entrained over such pulleys. The other driving connection is similar, consisting of a pulley 29 on shaft 26 of motor 19, a pulley 32 on the rear end of gearing mechanism 24, and a belt 31 drivingly connecting such latter two pulleys. It is to be understood that, if desired, other conventional driving connections such as shafts and gears may be employed between the engines and the respective ends of the driving mechanism 24.

Figure 5:
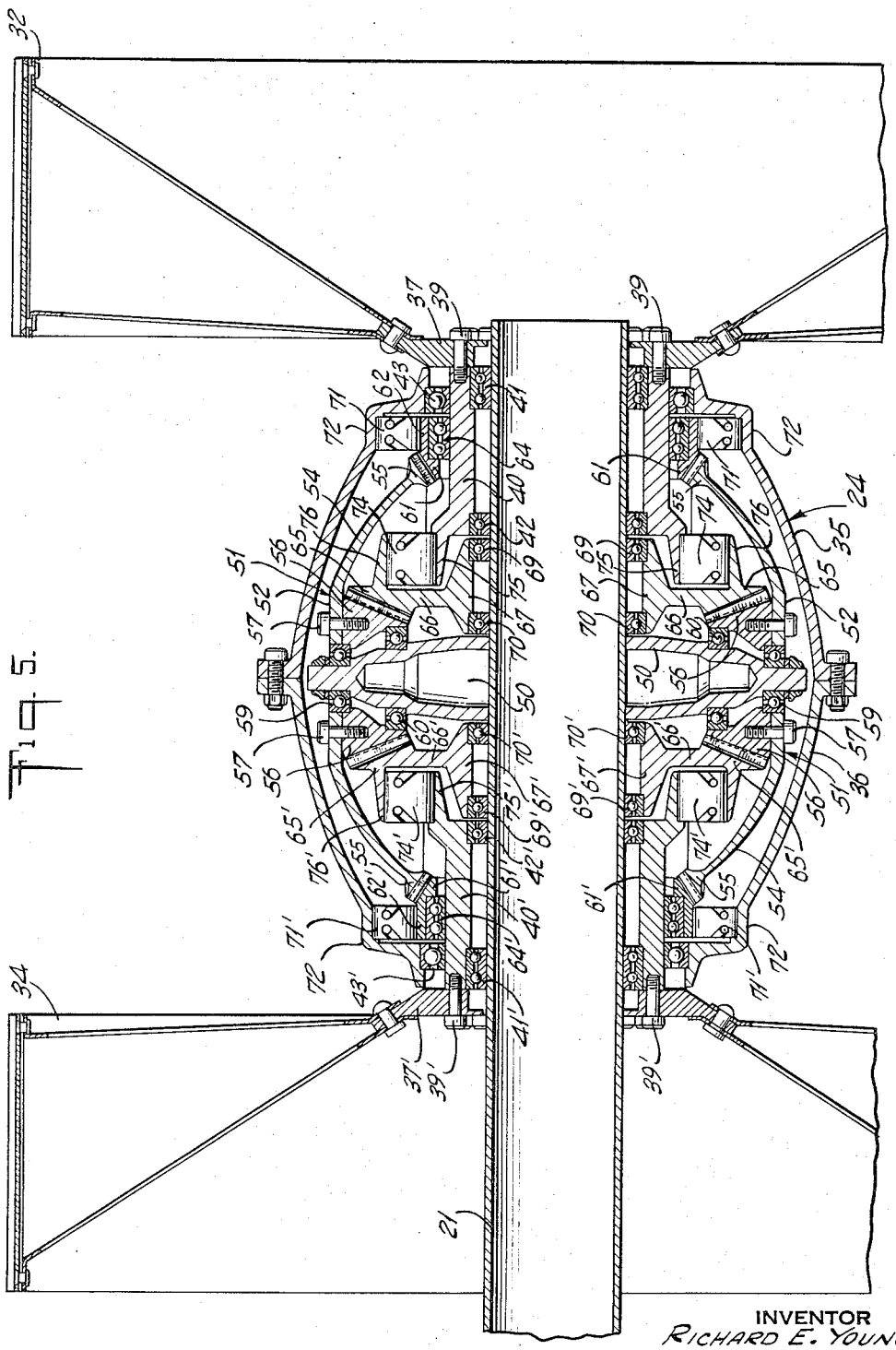
FIG. 5 is a view in vertical axial section through the variable speed driving mechanism in accordance with the invention which is employed in the airplane.

Turning now to FIGS. 5 and 6, the construction and manner of operation of the driving mechanism 24 will be more fully apparent. Such mechanism has a two-part housing having similar rear and forward portions 35 and 36, respectively, which are bolted together, as shown. The housing is secured to structural members of the airplane, not specifically shown, as are the engines 17 and 19. Thus the frame of the airplane absorbs the reactive forces between the engines, the mechanism 24 and the propeller 20 on the driven shaft 21. Shaft 21 in the embodiment shown is in the form of a thin walled tube which extends axially through and is journalled in bearings within the housing 35, 36.

Since the two end portions of the gearing mechanism 24 are the same, it will suffice to describe in detail the parts of the mechanism which are directly drivingly associated with the pulley 32. Parts of mechanism 24 which are directly drivingly associated with the pulley 34 are designated by the same reference characters with an added prime. A sleeve 40 is telescoped about the rear end of shaft 21 and is journalled thereon by a rear bearing 41 and a forward bearing 42. Pulley 32 has a central hub 37 which is drivingly secured to the rear end of the sleeve 40 by a plurality of studs 39. Sleeve 40 is further journalled by a bearing 43 which is interposed between the outer surface of the sleeve and a seat in housing part 35. The driving pulley 34, which is constructed similarly to pulley 32, has a central hub member 37' which is secured by a plurality of machine screws or studs 39' to the forward end of a tubular shaft or sleeve 40' which is similar to the sleeve 40, above described. Sleeve 40' is journalled upon the shaft 21 by a front bearing 41' and a rear bearing 42', and is further journalled in the housing part 36 by a bearing 43' which is disposed between the outer surface of sleeve 40' at its forward end and a bearing receiving seat in the forward end of housing part 36.

Affixed to the shaft 21 centrally of the housing 35, 36, as by being welded to the shaft, are two oppositely disposed radially extending bearing spindles 50. Journalled on the outer end of each of spindles 50 is a reaction planetary gear 51 having a flat central portion 52 and a radially outer radially inwardly dished portion 54. An annular gear 55 is affixed to the outer edge of the dished portion of gear 51. Secured to the flat portion 52 of each of the planetary gears 51 by a plurality of machine screws or studs 57 is a planet gear 56. Each of the gear sets 51, 56 is journalled upon its spindle 50 by a radially outer bearing 59 and a radially inner bearing 60, as shown.

An axially short sleeve 62 is journalled upon sleeve 40 radially outwardly thereof by means of a double-row ball bearing 64. The axially inner end of sleeve 62 is provided with an annular gear 61 which meshes with the gear 55 on the outer edge of the reaction planetary gear 51. Sleeve 62 is free for rotation about its axis during normal operation of the mechanism 24, in which the shaft 21 is driven by both engines 17 and 19 rotating at the same speed. Under such condition, gears 55 and 61 remain in mesh but do not rotate with respect to each other, the spindles 50 and the gears 51 and 56 mounted on each spindle rotating as a unit about the axis of shaft 21. The drive from pulley 32 to the spindle 50 and thus to the shaft 21 proceeds through the sleeve 40 to the gear 56 as follows.

Meshing with gear 56 is a ring gear 65 which functions as a primary sun gear. Gear 65 is provided with a radially extending annular flange 66 which terminates at its inner end in an axially extending sleeve 67. Sleeve 67 is journalled upon shaft 21 by a rear bearing 69 and a forward bearing 70. Interposed between the forward end of sleeve 40 and the gear 65 is an overrunning clutch 74 which functions to provide a positive drive between sleeve 40 and gear 65 when the sleeve 40 is driven by its engine 19, but which permits gear 65 to rotate freely in its forward, driven direction with respect to sleeve 40 when such sleeve does not rotate. Clutch 74, which may be of conventional construction such as that known as the Formsprag overrunning clutch manufactured by the Formsprag Company of Warren, Mich., has the radially inner portion thereof seated on an axially extending flange 75 on sleeve 40 and the radially outer portion thereof secured to an axially extending flange 76 on gear 65.

The sleeve 62 is automatically secured to the housing part 35 so as to be prevented from rotation with respect thereto upon the stopping of the engine which drives pulley 32. In the embodiment shown, this is effected by a second overrunning clutch 71 having a radially inner portion secured to the outer surface of sleeve 62 and a radially outer portion which is secured to housing part 35 by being mounted in a seat within a circular cylindrical rear portion 72 of such housing part.

The mechanism 24 functions as follows when both engines are running at the same speed: torque from engines 17 and 18 is delivered to pulleys 27 and 29, respectively, and is then delivered from the pulleys 34 and 32, respectively, through the tubular shafts 40, 40' and the overrunning clutches 74, 74', to the primary sun gears 65, 65'. The two sun gears 65, 65' both mesh with the two planet gears 56, each applying tangenital force in the positive rotational direction relatice to the shaft 21. These forces being equal and opposite rotationally with respect to the planet gears and their bearing spindles 50, are directly additive and the total tangential force is delivered to the spindles 50 and the central shaft 21 to which they are rigidly attached. There will be no rotation of the planet gears 56 about their axes as the forces applied thereto are in balance. Under such conditions, all members of the system therefore rotate in unison without relative motion between meshing gears.

If one of the engines 17, 19, for example the engine 17, should stop, the mechanism 24 would act as follows if the reaction planet gears 51, 55 and the overrunning clutches were not provided. If the pulley 34 were to be fixed or at rest, and the right-hand system (FIGS. 5 and 6) were to be driven at normal speed and torque by engine 19, the planet gears 56 would roll on the sun gear 65', which is now fixed by clutch 74', while rotating on their spindles 50. Because of the geometry of the illustrative embodiment of FIG. 5, the output shaft 21 would then turn at one-half the speed of pulley 32 and would have two times the torque. Such a change in ratio is not appropriate for adjusting the propeller load to the new conditions, nor would it be correct for most other types of load. Additional components are therefore provided as shown, so that the correct single engine ratio is inherently available.

This is accomplished by the addition of the secondary set of gears 55, 61 and the clutches 71, 71'. The reaction planetary gears 51, 55 are fixed to the respective primary planet gears 56, the gears 51 and 56 being journalled on the respective spindles 50. The primary sun gear 65 meshes with the primary planet gears 56. The sun gear 61 is connected to the fixed housing part 35 through the overrunning clutch 71 which allows sleeve 62 and gear 61 to turn only in the normal direction of the shaft 21.

Now, when torque on the left-hand input pulley 34 decreases to zero, there is a net torque on the planet assembly, gears 51, 55, and 61', causing a reaction torque on the left reaction sun gear 61' locking it through the left overrunning clutch 71' to the fixed housing part 36. Now the planetary assemblies rotate on their spindles 50 at a speed dependent upon the pitch diameter ratio of gear 61' to gear 56. This action will control the rotational speed of primary planet gears 56, thereby establishing a new ratio between the remaining, driven input pulley 32 and the output shaft 21. The four gears in the system are measured by number of teeth or pitch diameter. The new speed ratio is the result of the relative gear sizes selected and is equal to $$\left[1+\left(\frac{\text{diam. gear 56}}{\text{diam. gear 65'}}\times\frac{\text{diam. gear 61'}}{\text{diam. gear 51}}\right)\right]:1$$

It is to be noted that the primary sun gear 65' on which there is no input torque will continue to turn at a lower speed and is freed by the overrunning clutch 74' from its pulley 34, which may be at rest. The ratio of the speed of sun gear 65' to the output shaft 21 will be equal to $$\left[1-\left(\frac{\text{diam. gear 56}}{\text{diam. gear 65'}}\times\frac{\text{diam. gear 61'}}{\text{diam. gear 51}}\right)\right]:1$$

The overrunning clutches 74 and 74' may, if desired, be such as to be capable of control, or they may be mounted in parallel with a controllable friction clutch, whereby to provide engine starting torque for one engine from the propeller shaft which is then driven by the other, operative, engine.

It is to be noted that in the illustrative embodiment the engines 17 and 19 of the airplane face aft rather than forward as in a normal airplane. There is a distinct advantage of this reversal of the engines, as the propellor shaft may be longer, which improves its structural mounting. Such arrangement also permits the gear box and its pulleys to be placed further aft, thus facilitating streamlining of the engines and power transmitting system of the airplane.

Although only a single preferred embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus although two planet gears are employed in the illustrative system, it is to be understood that one planet gear, or any feasible number in excess of two may be used if desired. Further, the drive mechanism of the invention may be used to advantage in multiples. For example, the power of four engines can be integrated or delivered to one driven output shaft such as a propellor shaft for an airplane by the use of three drive mechanisms in accordance with the invention. In such arrangement, the four engines are arranged in pairs, each pair of engines being connected by its respective one of first and second drive mechanisms. The output shafts from the two first drive mechanisms are in turn connected to a third drive mechanism which drives the output shaft.

What is claimed is:

1. A vehicle having a vehicle-propelling means, a first shaft connected to drive the propelling means, two prime movers for driving the first shaft, and gearing mechanism interposed between said two prime movers and the first shaft for selectively driving the first shaft by both said two prime movers at a first speed ratio with respect thereto and for driving the first shaft by only one of said two prime movers at a second speed ratio with respect thereto, said gearing mechanism comprising two opposed aligned sun gears, at least one planet gear meshing with the sun gears and rotatable as a whole about the common axis of the sun gears, means mounting the planet gear for rotation about its axis, said mounting means being drivingly connected to the first shaft so as to rotate in synchronism therewith, two second shafts drivingly connected to the respective prime movers, means drivingly connecting the second shafts to the respective sun gears, the last named means being so constructed and arranged that the planet gear rotates about its axis at a first, predetermined speed in a predetermined direction when both prime movers are operating at predetermined speeds, and means drivingly connected to the planet gear, and selectively operated when one of said second shafts is driven at said predetermined speed and the other is undriven, to drive the planet gear about its axis in the same predetermined direction but at a second speed, which is different from and bears a predetermined relation to said first predetermined speed thereof.

2. A vehicle having a vehicle-propelling propeller, a first shaft connected to drive the propeller, two similar prime movers for driving the first shaft, and gearing mechanism interposed between said two prime movers and the first shaft for selectively driving the first shaft by both said two prime movers at a first speed ratio with respect thereto and for driving the first shaft by only one of said two prime movers at a second speed ratio with respect thereto, said gearing mechanism comprising two similar opposed aligned sun gears, at least one planet gear meshing with the sun gears and rotatable as a whole about the common axis of the sun gears, means mounting the planet gear for rotation about its axis, said mounting means being drivingly connected to the first shaft so as to rotate in synchronism therewith, two second shafts drivingly connected to the respective prime movers, means drivingly connecting the second shafts to the respective sun gears, the last named means being so constructed and arranged that the planet gear rotates about its axis at a first, predetermined speed in a predetermined direction when both prime movers are operating at predetermined speeds, and means drivingly connected to the planet gear, and selectively operated when one of said second shafts is driven at said predetermined speed and the other is undriven, to drive the planet gear about its axis in the same predetermined direction but at a second speed, which is different from and bears a predetermined relation to said first predetermined speed thereof.

3. An aircraft having a propeller, a first shaft connected to drive the propeller, two similar prime movers for driving the first shaft, and gearing mechanism interposed between said two prime movers and the first shaft for selectively driving the first shaft by both said two prime movers at a first higher speed ratio with respect thereto and for driving the first shaft by only one of said two prime movers at a second lower speed ratio with respect thereto, said gearing mechanism comprising two similar opposed aligned sun gears, at least one planet gear meshing with the sun gears and rotatable as a whole about the common axis of the sun gears, means mounting the planet gear for rotation about its axis, said mounting means being drivingly connected to the first shaft so as to rotate in synchronism therewith, two second shafts drivingly connected to the respective prime movers, means drivingly connecting the second shafts to the respective sun gears, the last named means being so constructed and arranged that the planet gear rotates about its axis at a first, predetermined speed in a predetermined direction when both prime movers are operating at predetermined speeds, and means drivingly connected to the planet gear, and selectively operated when one of said second shafts is driven at said predetermined speed and the other is undriven, to drive the planet gear about its axis in the same predetermined direction but at a second speed, which is different from and bears a predetermined relation to said first predetermined speed thereof.

4. An aircraft as claimed in claim 3, wherein the selectively operated means for driving the first recited planet gear comprises a second planet gear drivingly connected to the first recited planet gear and mounted for rotation about its axis and for joint rotation about the common axis of the sun gears, and a further gear coaxial of the sun gears and meshing with the second planet gear.

5. An aircraft as claimed in claim 4, comprising means for selectively changing the speed of rotation of the further gear about its axis.

6. An aircraft as claimed in claim 4, comprising means for selectively stopping the rotation of the further gear and for freeing it for rotation about its axis.

7. An aircraft as claimed in claim 3, wherein the selectively operated means for driving the first recited planet gear comprises a second planet gear drivingly connected to the first recited planet gear and mounted for rotation about its axis and for joint rotation about the common axis of the sun gears, and at least one further gear coaxial of the sun gears, disposed on one side of the axis of the planet gears, and meshing with the second planet gear.

8. An aircraft as claimed in claim 7, comprising means for selectively changing the speed of rotation of the further gear about its axis.

9. An aircraft as claimed in claim 3, wherein the selectively operated means for driving the first recited planet gear comprises a second planet gear drivingly connected to the first recited planet gear and mounted coaxial thereof for rotation about their common axis and for joint rotation about the common axis of the sun gears, and two further gears coaxial of the sun gears, disposed on opposite sides of the axis of the planet gears, and meshing with the second planet gear.

10. An aircraft as claimed in claim 9, comprising means for alternatively selectively changing the speed of rotation of each of the further gears about its axis.

11. An aircraft as claimed in claim 9, comprising means for alternatively selectively stopping the rotation of each of the further gears and for freeing it for rotation about its axis.

12. An aircraft as claimed in claim 11, comprising an overrunning clutch interposed between each of the second shafts and its respective sun gear, whereby when one of the prime movers stops and the other prime mover rotates the second shaft which is connected to the prime mover which has stopped continues to rotate in the same direction.

13. An aircraft as claimed in claim 12, comprising a further driving means connected to the first prime mover and having means which may be selectively coupled to the said first sun gear, whereby the first prime mover, which has been stopped, may be driven by the second operating prime mover.

14. A gearing mechanism adapted for the selective driving of a driven shaft from two sources of driving power and from one of said sources, said mechanism comprising two aligned sun gears, at least one planet gear meshing with the sun gears and rotatable about the common axis of the sun gears, means mounting the planet gear for rotation about its axis, said mounting means being drivingly connected to the driven shaft so as to rotate in synchronism therewith, two driving shafts connected to the respective sun gears and adapted to be connected to the respective sources of driving power, and selectively operated means drivingly connected to the planet gear to drive the planet gear about its axis at a predetermined speed relative to the speed of one of said driving shafts.

15. A gearing mechanism as claimed in claim 14, wherein the selectively operated means for driving the first recited planet gear comprises a second planet gear drivingly connected to the first recited planet gear and mounted for rotation about its axis and for rotation about the common axis of the sun gears, and a further gear coaxial of the sun gears and meshing with the second planet gear.

16. A gearing mechanism as claimed in claim 15, comprising means for selectively changing the speed of rotation of the further gear about its axis.

17. A gearing mechanism as claimed in claim 15, comprising means for selectively stopping the rotation of the further gear and for freeing it for rotation about its axis.

18. A gearing mechanism as claimed in claim 14, wherein the selectively operated means for driving the first recited planet gear comprises a second planet gear drivingly connected to the first recited planet gear and mounted for rotation about its axis and for rotation about the common axis of the sun gears, and two further gears coaxial of the sun gears, disposed on opposite sides of the axis of the planet gears, and meshing with the second planet gear.

19. A gearing mechanism as claimed in claim 18, comprising means for alternatively selectively changing the speed of rotation of each of the further gears about its axis.

20. A gearing mechanism as claimed in claim 19, comprising means for alternatively selectively stopping the rotation of each of the further gears and for freeing it for rotation about its axis.

21. A gearing mechanism adapted for the selective driving of a driven shaft from two similar sources of driving power at a first speed ratio and from either of said sources alone at a second speed ratio, said mechanism comprising two similar first opposed aligned sun gears, at least one planet gear meshing with the first sun gears and rotatable about the common axis of the sun gears means mounting the planet gear for rotation about its axis, said mounting means being drivingly connected to the driven shaft so as to rotate in synchronism therewith, two driving shafts connected to the respective first sun gears and adapted to be connected to the respective sources of driving power, a second planet gear having an effective diameter different from that of the first planet gear drivingly connected to the first planet gear and mounted for rotation about its axis and for rotation about the common axis of the first sun gears for normally free rotation, a second sun gear disposed on one side of the axis of the planet gear and meshing with the second planet gear, and means for stopping the rotation of said second sun gear upon the stopping of one of the sources of driving power, whereby to change the ratio of the speed of driving of the driven shaft by the other source of driving power through the gearing mechanism.

22. A mechanism as claimed in claim 21, comprising an overrunning clutch interposed in each of the driving shafts, whereby the one of the first sun gears which is connected to a said one source of driving power which has stopped continues to rotate in the same direction.

23. A mechanism as claimed in claim 21, comprising a further driving means which may be selectively coupled to the said one of the first sun gears, whereby the said one source of driving power which has been stopped may be driven by the other, operating source of driving power.

24. An airplane having a tractor propeller, a central propeller shaft extending longitudinally of the airplane and connected to drive the propeller, two similar engines disposed side by side behind the propeller and one on each side of the propeller shaft for driving the propeller shaft, and gearing mechanism disposed centrally of the two engines rearwardly thereof and interposed between said two engines and the propeller shaft for driving the propeller shaft by said two engines.

25. An airplane as claimed in claim 24, wherein said gearing mechanism selectively drives the propeller shaft by said two engines at a first, higher speed ratio with respect thereto and drives the propeller shaft by only one of said two engines at a second, lower speed ratio, said gearing mechanism comprising two similar opposed aligned sun gears, at least one planet gear meshing with the sun gears and rotatable about the common axis of the sun gears, means mounting the planet gear for rotation about its axis, said mounting means being drivingly connected to the propeller shaft so as to rotate in synchronism therewith, two second shafts connecting the engines to the respective sun gears, and selectively operated means drivingly connected to the planet gear to drive the planet gear about its axis at a predetermined speed relative to the speed of one of said second shafts.

References Cited

UNITED STATES PATENTS

| | | | |
|---|---|---|---|
| 1,350,456 | 8/1920 | Hewitt | 74—661 |
| 2,332,838 | 10/1943 | Borgward | 74—722 X |
| 2,779,212 | 1/1957 | Fell | 74—661 X |

FRED C. MATTERN, JR., *Primary Examiner.*

DAVID J. WILLIAMOWSKY, *Examiner.*

C. J. HUSAR, *Assistant Examiner.*